(12) United States Patent
Braun et al.

(10) Patent No.: US 8,695,662 B2
(45) Date of Patent: Apr. 15, 2014

(54) TRUCK TIRE WITH RUBBER TREAD

(75) Inventors: Lothar Braun, Bollendorf (DE); Fahri Ozel, Eischen (LU); Carolin Anna Welter, Sandhausen (DE); Jean-Marie Feller, Messancy (BE); Tom Dominique Linster, Gilsdorf (LU); Julia Martine Francoise Claudine Tahon, Reckange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 184 days.

(21) Appl. No.: 13/331,352

(22) Filed: Dec. 20, 2011

(65) Prior Publication Data

US 2013/0153101 A1 Jun. 20, 2013

(51) Int. Cl.
*B60C 5/00* (2006.01)

(52) U.S. Cl.
USPC ............................................. 152/450

(58) Field of Classification Search
USPC ............................................. 152/450
See application file for complete search history.

(56) References Cited

U.S. PATENT DOCUMENTS

| | | | | |
|---|---|---|---|---|
| 5,087,668 A * | 2/1992 | Standstrom et al. | ......... | 525/237 |
| 5,336,730 A | 8/1994 | Sandstrom et al. | ......... | 525/332.6 |
| 2007/0037917 A1* | 2/2007 | Sandstrom | ......... | 524/493 |
| 2010/0000639 A1 | 1/2010 | Randall et al. | ......... | 152/209.1 |
| 2011/0071253 A1 | 3/2011 | Hochi | ......... | 524/571 |
| 2012/0053286 A1* | 3/2012 | Zhao et al. | ......... | 524/517 |

FOREIGN PATENT DOCUMENTS

| | | | | |
|---|---|---|---|---|
| EP | 1254786 | 11/2002 | ......... | B60C 1/00 |
| EP | 1452344 | 9/2004 | ......... | B60C 11/00 |
| EP | 1533338 | 5/2005 | ......... | C08L 21/00 |
| JP | 2005263892 | 3/2004 | ......... | C08L 7/00 |
| JP | 2009040853 | 2/2009 | ......... | B60C 1/00 |
| JP | 2009292942 | 12/2009 | ......... | C08L 9/00 |
| KR | 20020037600 | 5/2002 | ......... | C08L 21/00 |
| KR | 20020037600 A * | 5/2002 | ......... | C08L 21/00 |

OTHER PUBLICATIONS

Pages 197-202, "Effects of 1,6-bis(n,N'-dibenzyl thiocarbamoyl dithio)-Hexane on Property of Filled Natural Rubber Vulcanizates", Byung-Ho Park, et al., *Journal of Industrial Engineering Chemicals*, vol. 8, No. 3 (2002).

European Search Report.

* cited by examiner

*Primary Examiner* — Ling Choi
*Assistant Examiner* — Lanee Reuther
(74) *Attorney, Agent, or Firm* — Henry C. Young, Jr.

(57) ABSTRACT

This invention relates to a tire with a circumferential rubber tread comprised of a rubber composition for promotion of reduced internal heat build-up. The invention particularly relates to truck tires.

8 Claims, No Drawings

TRUCK TIRE WITH RUBBER TREAD

FIELD OF THE INVENTION

This invention relates to a tire with a circumferential rubber tread comprised of a rubber composition for promotion of reduced internal heat build-up. The invention particularly relates to truck tires.

BACKGROUND OF THE INVENTION

Pneumatic rubber tires are conventionally prepared with a tread composed of elastomer(s) reinforced with carbon black and sometimes with silica or a combination of carbon black and silica such as for example precipitated silica.

This invention is more specifically directed to truck tires and other relatively large tires including relatively heavy duty light truck tires, which are normally expected to be capable of supporting and carrying relatively large vehicular loads and, thus, tend to generate a greater internal heat build-up and a resulting higher internal operating temperature than ordinary passenger vehicle tires.

The truck tire treads are typically of a cap/base configuration, with the outer tread cap rubber layer intended to be ground-contacting, namely containing a running surface for the tread, which usually contains a lug and groove configuration. The underlying, internal, rubber layer, which is usually a tread base rubber layer, underlies and supports the tread cap rubber layer and is generally positioned between the tread cap and the tire carcass to provide a transition of rubber properties. Generally, the tread cap and tread base rubber layers are co-extruded together as an uncured component of the tire construction and cured, or vulcanized together with the overall tire construction in a suitable mold under conditions of elevated temperature and pressure. Such tread and tire configuration is well known to those having skill in such art.

For such relatively heavy duty tires, internal heat build-up of its tread, as evidenced by tire tread running temperature build-up, or increase, is normally not desired, although a portion of the heat buildup, or temperature increase, is relatively unavoidable during a running of the tire under load.

A challenge is presented of providing such tire with a tread which promotes reduced internal heat build-up during service.

For such challenge, a tire tread rubber composition is envisioned for evaluation which comprised of a cis 1,4-polyisoprene rubber based rubber composition which contains a high surface area precipitated silica with minimal carbon black reinforcement, 3,4 polyisoprene, hydrocarbon resin and sulfur cure package comprised of sulfur and sulfur cure accelerators.

A purpose of utilizing a high surface area precipitated silica for evaluation for reinforcement for the tread cap elastomer in a tread of cap/base construction, with tread cap rubber of natural rubber/synthetic rubber composition, is to provide a tire tread construction which can run about as cool as and with acceptable treadwear as compared to a natural rubber tread reinforced with carbon black. It is contemplated that a truck tire running under loaded conditions with a quantitatively silica reinforced rubber tread cap, in a tread of cap/base construction, would experience less temperature buildup than a truck tire with a comparable carbon black reinforced rubber tread cap.

Inclusion of a small amount of 3,4-polyisoprene for such evaluation is to evaluate promoting traction for the rubber composition. Use of 3,4-polyisoprene in rubber composition for tire application purposes may be found, for example, in U.S. Pat. Nos. 5,087,668 and 5,336,730.

Use of a small amount of a salt of at least one fatty acid soap (e.g. product of at least one of stearic, palmitic and oleic acid soap with at least one of zinc oxide, magnesium oxide, magnesium carbonate and calcium carbonate, usually in situ within the rubber composition) for such evaluation is to evaluate promoting easier processing for the uncured rubber composition.

A purpose of providing a designed sulfur cure package for such evaluation is to promote resistance to cure reversion for the rubber composition and therefore a more cure reversion resistant rubber composition.

Therefore, it is desired to innovate and provide an evaluation beyond simply providing precipitated silica reinforcement for a truck tire tread.

The term "phr" where used herein, and according to conventional practice, refers to "parts of a respective material per 100 parts by weight or rubber, or elastomer".

In the description of this invention, the terms "rubber" and "elastomer", where used herein unless otherwise prescribed, are used interchangeably. The terms "rubber composition", "compounded rubber" and "rubber compound" where used herein unless otherwise prescribed, are used interchangeably to refer to "rubber which has been blended or mixed with various ingredients or materials" and such terms are well known to those having skill in the rubber mixing, or rubber compounding, art.

The Tg of a polymer, particularly an elastomer, as used herein unless otherwise prescribed, refers to its glass transition temperature which can conventionally be determined, for example, by a differential scanning calorimeter at heating rate of 15° C. to an observed transition of the temperature versus time curve. It is understood that such Tg determination is well known to those having skill in such art.

SUMMARY AND PRACTICE OF THE INVENTION

In accordance with this invention, a pneumatic tire is provided with a circumferential tread having a cap/base configuration comprised of an outer tread cap rubber layer (to provide a running surface for the tire) and an internal rubber layer underlying said outer tread cap rubber layer (sometimes referred to as a tread base rubber layer) rubber, wherein the rubber composition of said tread cap rubber layer is comprised of, based on parts by weight per 100 parts by weight rubber (phr):

(A) elastomers comprised of
  (1) about 65 to about 90 phr of cis 1,4-polyisoprene rubber (preferably natural cis 1,4-polyisoprene rubber),
  (2) about 5 to about 25 phr of cis 1,4-polybutadiene rubber,
  (3) from zero to about 12, alternately from about 5 to about 12, phr of 3,4-polyisoprene rubber and
  (4) optionally up to about 20 phr of at least one additional rubber selected from polymers of at least one of isoprene and 1,3-butadiene and copolymers of styrene and at least one of isoprene and 1,3-butadiene, (B) about 1 to about 8 phr of salt of at least one fatty acid comprised of the product of at least one of stearic, palmitic and oleic acid and at least one of zinc oxide, magnesium oxide and calcium carbonate, preferably calcium carbonate, (C) from zero to about 20, alternately from about 5 to about 20, phr of hydrocarbon resin, (D) about 45 to about 70, alternately from about 52 to about 65, phr of reinforcing filler comprised of:

(1) amorphous, synthetic silica (e.g. precipitated silica) having a nitrogen surface area (BET) in a range of from about 210 to about 225 m$^2$/g, together with a coupling agent for said precipitated silica having a moiety reactive with hydroxyl groups (e.g. silanol groups) on said precipitated silica and another, different, moiety interactive with said elastomer(s), or (2) a combination of rubber reinforcing carbon black and said precipitated silica containing from about 2 to about 15, alternately from about 2 to about 10, phr of said rubber reinforcing carbon black together with coupling agent for said precipitated silica having a moiety reactive with hydroxyl groups (e.g. silanol groups) on said precipitated silica and another, different, moiety interactive with said elastomer(s), and (E) curative for said rubber composition comprised of sulfur and sulfur cure accelerator where said sulfur cure accelerator is comprised of a combination of primary sulfur cure accelerator and secondary sulfur cure accelerator, where said primary sulfur cure accelerator is comprised of at least one of N-tertbutyl-2-benzothiazolesulfenamide and N—N-dicyclohexyl-2-benzothiazolesulfenamide, and where said secondary sulfur cure accelerator is comprised of 1,6-bis(N,N-dibenzylthiocarbamoyldithio)hexane, and where said secondary cure accelerator may optionally include diphenyl guanidine.

In practice, said 1,6-bis(N,N-dibenzylthiocarbamoyldithio)hexane secondary sulfur cure accelerator, if desired, may provided on a silica carrier. It may optionally be treated with an oil which contains a maximum of 1 mg/kg, if any, of benzo(a)pyrene, and a maximum of 10 mg/kg, if any, of polycyclic aromatic hydrocarbons.

In practice, the weight ratio of said precipitated silica to said carbon black may be, for example and if desired, in a range of from about 8.5/1 to about 9.2/1.

Representative of said high surface precipitated silica is, for example, Zeosol™ 200 MP from Rhodia.

Representative of said silica coupling agent is, for example, comprised of bis(3-trialkoxysilylalkyl)polysulfide having an average of from about 2 to about 4 connecting sulfur atoms in its polysulfidic bridge or an organosiloxymercaptosilane.

For example, said silica coupling agent may be comprised of bis(3-triethoxysilylpropyl)polysulfide having an average of from about 2 to about 2.6, alternately from about 3.4 to about 3.8, connecting sulfur atoms in its polysulfidic bridge, representative of which are Si266™ and Si69™, respectively, from Evonic.

If desired, various resins may be added to the rubber composition such as for example, hydrocarbon resins.

In practice, such cap/base tread construction, or configuration, may be created by co-extruding the tread cap and tread base together through a singular die to form the extruded tread construction. Typically, the unvulcanized compounded rubber compositions for the tread cap and tread cap are extruded through the die at a temperature, for example, in a range of about 100° C. to about 125° C., often typically about 110° C. and, thus, is considered as being a relatively hot extrusion process, although such actual extrusion temperatures themselves are considered normal for a rubber extrusion process. The extruded tread stock is then built onto a rubber tire carcass to create an assembly thereof. The assembly is then vulcanized, or cured, at an elevated temperature. Such overall process is well known to those skilled in such art.

In this manner then, by the aforesaid co-extrusion process and the co-vulcanization of the tread cap and tread base, the tread cap and tread base are considered herein to be an integral, cooperative, unit, or component, of the tire.

A BET method of measuring nitrogen surface area is described in the *Journal of the American Chemical Society*, Volume 60 as well as ASTM D3037.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silica, and plasticizers, fillers, pigments, fatty acid, zinc oxide, waxes, antioxidants and antiozonants, peptizing agents and reinforcing materials such as, for example, silica and carbon black. As known to those skilled in the art, depending on the intended use of the sulfur vulcanizable and sulfur vulcanized material (rubbers), the additives mentioned above are selected and commonly used in conventional amounts.

Typical additions of carbon black, silica and silica coupler for this invention are hereinbefore set forth.

Typical amounts of processing aids comprise about 1 to about 30 phr. Such processing aids can include, for example, aromatic, naphthenic, and/or paraffinic processing oils and blends of various fatty acids such as, for example, various zinc based soaps.

Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of fatty acids, if used, which can include stearic acid, usually commercially provided as a blend of stearic acid and other similar fatty acids such as palmitic acid, etc, comprise about 0.5 to about 4 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur and sulfur cure accelerators as hereinbefore described.

The presence and relative amounts of the above additives are not considered to be an aspect of this invention, except as may hereinbefore be set forth, of the present invention which is more primarily directed to the truck tire.

The tire can be built, shaped, molded and cured by various methods which will be readily apparent to those having skill in such art.

The invention may be better understood by reference to the following examples in which the parts and percentages are by weight unless otherwise indicated.

EXAMPLE I

Rubber samples were prepared to evaluate an effect of preparing a rubber composition, for use as a tread rubber layer, having a reduced internal heat generation property.

The basic rubber composition (amounts rounded) for this Example is reported in the following Table 1 with parts and percentages, where appropriate, by weight unless otherwise indicated.

TABLE 1

| Compound | Parts (phr) |
|---|---|
| Non-Productive Mixing (NP) | |
| Natural cis 1,4-polyisoprene rubber | 0 and 85 |
| 3,4-polybutadiene rubber | 0 and 10 |
| Styrene/butadiene rubber | 0 and 12 |
| Cis 1,4-polybutadiene rubber (A) | 0 and 10 |
| Cis 1,4-polybutadiene rubber (B) | 0 and 20 |
| Rubber reinforcing carbon black (A) | 0 and 35 |
| Rubber reinforcing carbon black (B) | 0 and 6 |
| Salts of fatty acid soaps (salts of fatty acids comprised of at least one of stearic, palmitic and oleic acids with zinc oxide, magnesium oxide or calcium carbonate, predominately calcium based | 0 and 2 |
| Precipitated silica (A) | 0 and 35 |
| Precipitated silica (B) | 0 and 55 |
| Silica coupling agent (A) | 0 and 7 |
| Silica coupling agent (B) | 0 and 14 |
| Zinc Oxide (in addition to the above fatty acid salt) | 0 and 3 |
| Fatty acid (in addition to the above fatty acid salt) | 0 and 3 |
| Antioxidant(s) | 0 and 2 |
| Productive Mixing (P) | |
| Sulfur | 0 and 1.5 |
| Sulfur cure accelerator(s) (X) | 0 and 2 |
| Sulfur cure accelerator(s) (Y) | 0 and 0.2 |

For this evaluation, rubber Samples A through E were evaluated.

Control rubber Sample A was prepared with components comprised of a combination of cis 1,4-polyisoprene natural rubber and cis 1,4-polybutadiene rubber (A), styrene/butadiene rubber, precipitated silica (A), carbon black (A), fatty acid salts/soaps (predominately calcium based), and sulfur cure system comprised of sulfur with sulfenamide and diphenyl guanidine accelerators.

Experimental rubber Sample B was prepared with components comprised of a combination of 3,4-polyisoprene rubber and cis 1,4-polybutadiene rubber (B), carbon black (B), fatty acid salts/soaps (predominately calcium based), and sulfur cure system comprised of sulfur with sulfenamide and 1,6-bis(N,N-dibenzylthiocarbamoyldithio)hexane sulfur cure accelerators.

The rubber compositions were prepared by blending the ingredients in an internal rubber mixer in a series of sequential mixing steps while sheeting out the rubber mixtures and cooling to a temperature below 40° C. between mixing steps. The sequential mixing steps were comprised of a non-productive mixing step(s), (NP), followed by a productive mixing step (P), (in which sulfur and sulfur cure accelerators were added).

Such sequential mixing steps are well known to those having skill in such art.

The following Table 2 reports cure behavior and various physical properties of rubber Samples A and B taken from the formulation illustrated Table 1. The rubber samples were sulfur cured, where appropriate, for about 18 minutes at about 150° C.

TABLE 2

| | Parts (phr) | |
|---|---|---|
| | Elastomer A | Elastomer B |
| Natural cis 1,4-polyisoprene rubber (TSR grade) | 72-82 | 72-82 |
| 3,4-polyisoprene | 0 | 0-9 |
| Hydrocarbon resin (B) | 0 | 0-15 |
| Cis 1,4-polybutadiene rubber (A) | 9-13 | 0 |
| Cis 1,4-polybutadiene rubber (B) | 0 | 17-21 |
| Styrene/butadiene rubber | 8-12 | 0 |
| Precipitated silica (A) | 17-31 | 0 |
| Precipitated silica (B) | 0 | 50-55 |
| Silica coupler (A) | 6-7 | 0 |
| Silica coupler (B) | 0 | 11-13 |
| Fatty acid salts/soaps, predominately calcium based | 0-2 | 0-2 |
| Carbon black (A) | 30-35 | 0 |
| Carbon black (B) | 0 | 5-10 |
| Sulfenamide and diphenyl guanidine curatives | 0.2 | 0.2 |
| N-tertbutyl-2-benzothiazolesulfenamide and 1,6-bis (N,N-dibenzylthiocarbamoyldithio) hexane curatives | 0.25-2 | 0.25-2 |
| Properties | | |
| ATS (11 minutes at 170° C.) | | |
| Tensile strength (MPa) | 19-24 | 18-24.5 |
| Elongation at break (%) | 420-520 | 440-540 |
| Modulus (ring), 300% (MPa) | 13.5-13.6 | 11-14 |
| Hardness (Shore A), 23° C. | 63-78 | 59-73 |
| Rebound, Zwick (%), 100° C. | 55-69 | 68-84 |
| RPA, 100° C., 1 Hertz | | |
| Storage modulus (G'), 1% strain, MPa | 1.7-2.2 | 1.5-1.8 |
| Storage modulus (G'), 10% strain, MPa | 1.1-1.4 | 1.1-1.4 |
| Tan delta, 10% strain | 0.12-0.16 | 0.06-0.08 |
| Bayer belt test (relative with 25 = maximum) | 18 | 23 |

From Table 2 it is observed that Experimental rubber Sample B exhibited a high rebound value range (although a portion of the rebound ranges overlapped with Control rubber Sample A) and a low tan delta value range as compared to Control rubber Sample A. This is considered as being significant in a sense that Experimental rubber Sample is predictive of a tire with read of such rubber composition with beneficial relatively low rolling resistance to promote reduced vehicular fuel consumption as compared to Control rubber Sample A.

From Table 2 it is also observed that Experimental rubber Sample B has a high precipitated silica content as compared to Control rubber Sample A. This is considered as being significant in a sense that it is expected that Experimental rubber Sample B promotes good vehicular wet braking property for a tire with tread of such rubber composition as compared to Control rubber Sample A.

It can be concluded that Experimental rubber Sample B indicates promotion of improved (beneficial reduction of) vehicular rolling resistance as well as beneficial vehicular wet tire wet traction property for a tire with tread of such rubber composition as compared to Control rubber Sample A.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire with a circumferential tread having a cap/base configuration comprised of an outer tread cap rubber layer and an internal rubber layer underlying said outer tread cap rubber layer, wherein the rubber composition of said tread cap rubber layer is comprised of, based on parts by weight per 100 parts by weight rubber (phr):
  (A) elastomers consisting essentially of
    (1) about 65 to about 90 phr of cis 1,4-polyisoprene rubber,
    (2) about 5 to about 25 phr of cis 1,4-polybutadiene rubber, (3) about 5 to about 12 phr of 3,4-polyisoprene rubber and (B) about 1 to about 8 phr of salt of at least one fatty acid comprised of the product of at least one of stearic, palmitic and oleic acid together with at least one of zinc oxide, magnesium oxide and calcium carbonate, (C) about 45 to about 70 phr of reinforcing filler comprised of a combination of rubber reinforcing carbon black and said precipitated silica containing from about 2 to about 15 phr of said rubber reinforcing carbon black, together with coupling agent for said precipitated silica having a moiety reactive with hydroxyl groups on said precipitated silica and another, different, moiety interactive with said elastomer(s), and (D) curative for said rubber composition comprised of sulfur and sulfur cure accelerator where said sulfur cure accelerator is comprised of a combination of primary sulfur cure accelerator and secondary sulfur cure accelerator, where said primary sulfur cure accelerator is comprised of at least one of N-tertbutyl-2-benzothiazolesulfenamide and N—N-dicyclohexyl-2-benzothiazolesulfenamide, and where said secondary sulfur cure accelerator consists of 1,6-bis(N,N-dibenzylthiocarbamoyldithio) hexane.

2. The tire of claim 1 wherein said secondary sulfur cure accelerator further includes diphenyl guanidine.

3. The tire of claim 1 wherein said rubber composition contains from about 5 to about 20 phr of hydrocarbon resin.

4. The tire of claim 1 wherein said rubber composition contains about 1 to about 8 phr of salt of at least one fatty acid comprised of the product of at least one of stearic, palmitic and oleic acid and zinc oxide.

5. The tire of claim 1 wherein said rubber composition contains about 1 to about 8 phr of salt of at least one fatty acid comprised of the product of at least one of stearic, palmitic and oleic acid and calcium carbonate.

6. The tire of claim 1 where the weight ratio of said precipitated silica to said carbon black is in a range of from about 8.5/1 to about 9.2/1.

7. The tire of claim 1 wherein said rubber composition contains from about 52 to about 65 phr of said precipitated silica.

8. The tire of claim 1 wherein said rubber composition contains from about 52 to about 65 phr of reinforcing filler comprised of a combination of precipitated silica about 5 to about 20 phr of rubber reinforcing carbon black.

* * * * *